US012228989B2

(12) United States Patent
Rajwan et al.

(10) Patent No.: US 12,228,989 B2
(45) Date of Patent: *Feb. 18, 2025

(54) SYSTEM-ON-CHIP WITH DVFM PROTECTION CIRCUIT

(71) Applicant: Apple Inc., Cupertino, CA (US)

(72) Inventors: Doron Rajwan, Rishon Lezion (IL);
Ami Schwartzman, Kfar Saba (IL);
Lior Zimet, Kerem Maharal (IL)

(73) Assignee: Apple Inc, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,324

(22) Filed: Nov. 29, 2023

(65) Prior Publication Data

US 2024/0201766 A1 Jun. 20, 2024

Related U.S. Application Data

(63) Continuation of application No. 17/673,870, filed on Feb. 17, 2022, now Pat. No. 11,836,026.

(51) Int. Cl.
*G06F 1/28* (2006.01)
(52) U.S. Cl.
CPC ........................... *G06F 1/28* (2013.01)

(58) Field of Classification Search
CPC ........................................................ G06F 1/28
See application file for complete search history.

(56) References Cited

U.S. PATENT DOCUMENTS

| | | | |
|---|---|---|---|
| 7,519,838 B1* | 4/2009 | Suurballe | G06F 1/3203 |
| | | | 713/300 |
| 11,836,026 B1* | 12/2023 | Rajwan | G06F 1/3296 |
| 2009/0049314 A1* | 2/2009 | Taha | G06F 1/3296 |
| | | | 713/300 |

* cited by examiner

*Primary Examiner* — Mark A Connolly
(74) *Attorney, Agent, or Firm* — Meitar Patents Ltd.;
Daniel Kligler (57) ABSTRACT

A system includes multiple hardware circuits and protection circuitry. The multiple hardware circuits are coupled to respective power domains having respective sets of domain-specific power settings. The protection circuitry is configured to monitor requests in which one or more of the hardware circuits request transitions between the domain-specific power settings, to determine, from among multiple system-level combinations of the domain-specific power settings, a subset of system-level combinations that could potentially be traversed in performing the requested transitions, and to initiate a responsive action upon detecting that any of the system-level combinations in the subset is specified as invalid.

18 Claims, 5 Drawing Sheets

SYSTEM-ON-CHIP WITH DVFM PROTECTION CIRCUIT

CROSS-REFERENCE TO RELATED APPLICATIONS

This application is a continuation of U.S. patent application Ser. No. 17/673,870, filed Feb. 17, 2022, whose disclosure is incorporated herein by reference.

FIELD OF THE DISCLOSURE

The present disclosure relates generally to electronic circuitry, and particularly to methods and systems for voltage and clock-rate management in processors and other electronic devices.

BACKGROUND OF THE DISCLOSURE

Many microprocessors and other electronic devices include circuitry that adapts voltage levels and clock rates in order to optimize power consumption. Such schemes are commonly referred to as Dynamic Voltage and Frequency Management (DVFM). Various schemes for adaptive control of voltage and/or clock rate are known in the art.

For example, U.S. Pat. No. 11,054,882 describes a local throttling mechanism for the one or more processor cores. The local throttling mechanism supports one or more externally-triggered throttling mechanisms. An external source, such as a system-level power manager, may detect an energy-consumption state in the system as a whole and may trigger additional throttling in the processor core throttling mechanism. The externally-triggered throttling may temporarily increase throttling in the processor cores, in an embodiment, decreasing processor core energy consumption to account for the excess energy consumption in other parts of the system.

U.S. Pat. No. 10,955,893 describes techniques for dynamic voltage margin recovery. In an embodiment, an integrated circuit includes multiple instances of a component (e.g., a processor) and a control circuit. The instances may be configured to operate in various modes. Some of the modes are incapable of presenting a worst-case load on the power supply. The control circuit may be configured to monitor the instances and detect the modes in which the instances are operating. Based on the monitoring, the control circuit may request to recover a portion of the voltage margin established for worst-case conditions in the instances. If the instances are to change modes, they may be configured to request mode change from the control circuit. If the mode change causes an increase in the current supply voltage magnitude, the control circuit may cause the restore and permit it to complete prior to granting the mode change.

U.S. Pat. No. 9,195,291 describes a Digital Power Estimator (DPE) that monitors multiple processors to estimate the amount of power being consumed. If the estimate exceeds a power threshold, the DPE may throttle one or more of the processors. Additionally, throttling events may be monitored to determine if a change in the operating point is desired. In one embodiment, the DPE throttling events may be counted, and if the counts exceed a count threshold, a change in the operating point to a reduced operation point may be requested.

SUMMARY OF THE DISCLOSURE

An embodiment that is described herein provides a system including multiple hardware circuits and protection circuitry. The multiple hardware circuits are coupled to respective power domains having respective sets of domain-specific power settings. The protection circuitry is configured to monitor requests in which one or more of the hardware circuits request transitions between the domain-specific power settings, to determine, from among multiple system-level combinations of the domain-specific power settings, a subset of system-level combinations that could potentially be traversed in performing the requested transitions, and to initiate a responsive action upon detecting that any of the system-level combinations in the subset is specified as invalid.

In some embodiments, a given domain-specific power setting includes multiple control parameters. In example embodiments, the multiple control parameters include at least a voltage and a clock rate for the respective power domain.

In an embodiment, the protection circuitry is configured to grant a request in response to verifying that a transition requested in the request does not cause any of the invalid system-level combinations. In a disclosed embodiment, the responsive action includes halting at least part of the system.

In some embodiments, in the requests, the hardware circuits are configured to specify requested domain-specific power settings using indices having a defined order. In an example embodiment, for first and second power domains among the multiple power domains, the protection circuitry is configured to detect that a given system-level combination of domain-specific power settings is valid, by detecting that (i) a first index, of a domain-specific power setting requested for the first power domain, is lower than a first predefined threshold, and that (ii) a second index, of a domain-specific power setting requested for the second power domain, is higher than a second predefined threshold.

In another embodiment, the protection circuitry is configured to receive a second request for a second transition in a second power domain while a first transition is in progress in a first power domain, and, upon detecting that the second transition potentially causes an invalid system-level combination, to defer the second request and re-evaluate the second request only after the first transition is completed.

There is additionally provided, in accordance with an embodiment that is described herein, a method including operating multiple hardware circuits, which are coupled to respective power domains having respective sets of domain-specific power settings. Requests, in which one or more of the hardware circuits request transitions between the domain-specific power settings, are monitored. A subset of system-level combinations, which could potentially be traversed in performing the requested transitions, is determined from among multiple system-level combinations of the domain-specific power settings. A responsive action is initiated upon detecting that any of the system-level combinations in the subset is specified as invalid.

The present disclosure will be more fully understood from the following detailed description of the embodiments thereof, taken together with the drawings in which:

DETAILED DESCRIPTION OF EMBODIMENTS

Overview

Embodiments that are described herein provide techniques for securing electronic systems, such as Systems-On-Chip (SoCs), that include multiple power domains. In the present context, the term "power domain" (also interchangeably referred to as a "DVFM domain" or simply "domain" for brevity) refers to a part of the system that is powered by a respective voltage rail. The voltage levels in different power domains can typically be adjusted individually of one another. Typically, the clock rates in different power domains are individually adjustable, as well.

Typically, a given domain is set at a given time to a certain "domain-specific power setting" that is selected from a predefined group of domain-specific power settings. A given domain-specific power setting typically specifies multiple control parameters including at least (i) a voltage level and (ii) a clock rate, to be applied to the circuitry in that domain. The domain-specific power settings are also referred to herein as "DVFM settings" or "DVFM states".

In a typical implementation, each DVFM domain includes a DVFM controller that manages the DVFM settings for the domain. The DVFM controller typically runs a Finite State Machine (FSM), which transitions from one DVFM setting to another as needed. For example, when the computational load in a certain domain increases, the DVFM controller of that domain may transition to a DVFM setting having a higher clock rate and/or voltage level, in order to improve performance. When a domain becomes less busy, the DVFM controller of the domain may transition to a DVFM setting having lower clock rate and/or voltage level, to reduce energy consumption.

Within a given domain, the group of possible DVFM settings is typically predefined, e.g., locked upon boot, and the DVFM controller can only choose a DVFM setting from the predefined group. Each domain is therefore protected from incorrect (malicious or innocent) settings of voltage and clock rate.

At the system level, however, certain combinations of DVFM settings in different domains may be invalid and may lead to failure. Consider, for example, a scenario in which the circuitry in a first domain communicates with the circuitry in a second domain. If the first domain were set to a very high clock rate, and the second domain were set to a very low clock rate, transferring data or control signals between the domains may result in timing violations. In this scenario, the combination of the two DVFM settings is invalid, even though each individual DVFM setting is legitimate within its respective domain.

In some embodiments, the system further includes a power manager (PMGR) that, among other tasks, runs DVFM software that grants or denies requests from the various DVFM domains to transition between DVFM settings (DVFM states). The DVFM software is aware of the valid and invalid system-level combinations of DVFM settings, and grants or denies transition requests so as to avoid the invalid combinations. System-level combinations of DVFM settings are also referred to herein as "system-level states", for brevity.

The management scheme described above is effective and flexible, but may be prone to security attacks. For example, if the DVFM software in the PMGR is compromised, the attacker may be able to force invalid system-level states.

Thus, in some embodiments that are described herein, the system further includes a hardware-implemented DVFM protection circuit that protects the system from potentially hazardous system-level states. The protection circuit does not replace the DVFM software in managing DVFM state transitions. Rather, the protection circuit operates in parallel to the DVFM software. The protection circuit monitors the system operation, including the operation of the DVFM software, and initiates responsive action in case of abnormal behavior.

In a typical implementation, the protection circuit monitors the DVFM state transition requests issued by the various DVFM domains. Upon determining that performing the requested transitions may potentially traverse an invalid system-level combination (system-level state), the protection circuit initiates a suitable responsive action, e.g., halts at least part of the system. In this manner, the protection circuit avoids both steady-state invalid states (i.e., after the DVFM state transition is completed), and transient invalid states that may be traversed for a short period of time during the transition.

Consider a given clock cycle, in which N of the DVFM domains have requested DVFM state transitions ($N \geq 1$). As will be demonstrated below, the set of potentially-traversed system-level states can be represented as an N-dimensional cube in an N-dimensional space, wherein each dimension represents the DVFM settings of a respective DVFM domain. Any invalid system-level state falling inside the N-dimensional cube is regarded as a violation that warrants a responsive action.

In some embodiments, the protection circuit is also capable of sequencing DVFM state transitions. For example, upon detecting a possible traversal via an invalid system-level combination of DVFM settings, the protection circuit may defer one or more pending transition requests and re-evaluate them in a later clock cycle.

Various example implementations of the DVFM protection circuit are described herein. Since the protection circuit is implemented in hardware and its interfaces to the various DVFM domains are also pure hardware interfaces, it is protected against security threats that may compromise the DVFM software. In addition to providing security, the disclosed protection circuit is also effective in protecting against innocent design errors (in software or hardware) that might lead to invalid system-level combinations of DVFM settings.

System Description

Figure 1:
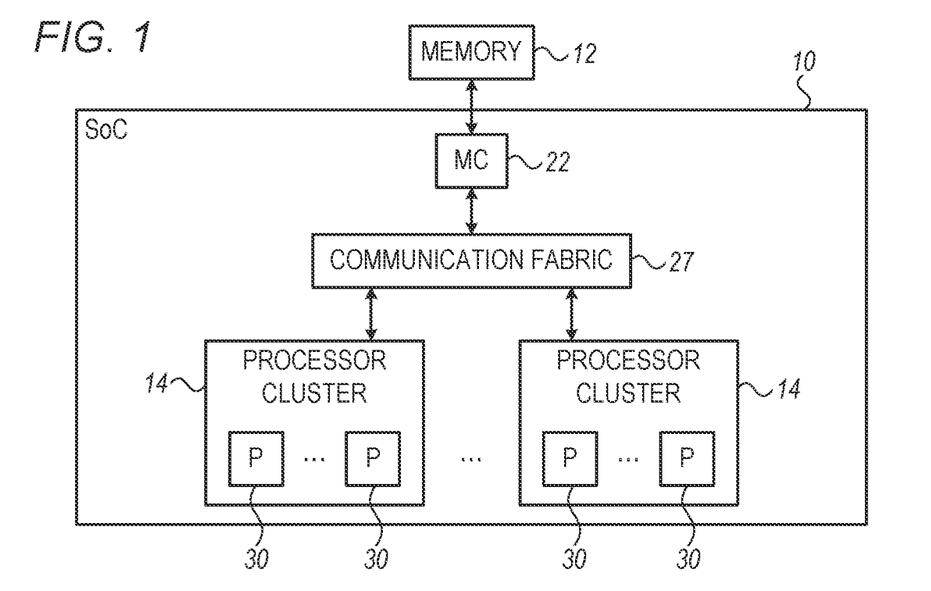
FIG. 1 is a block diagram that schematically illustrates a computing system implemented as a System-on-Chip chip (SoC), in accordance with an embodiment that is described herein.

FIG. 1 is a block diagram that schematically illustrates a computing system implemented as a System-on-Chip (SoC) 10, in accordance with an embodiment that is described herein. SoC 10 is shown coupled to a memory 12. As implied by the name, the components of SoC 10 may be integrated onto a single semiconductor substrate as an integrated circuit "chip." In some embodiments, the components may be implemented on two or more discrete chips in a system. However, SoC 10 will be used as an example herein. In the illustrated embodiment, the components of SoC 10 include a plurality of processor clusters 14, a Memory Controller (MC) 22, a communication fabric 27, and optionally one or more peripheral components (more briefly, "peripherals"—not shown in the figure). Processor clusters 14 and MC 22 may all be coupled to communication fabric 27.

Memory controller 22 may be coupled to memory 12 during use. In some embodiments, there may be more than one memory controller coupled to corresponding memory. The memory address space may be mapped across the memory controllers in any desired fashion. In the illustrated embodiment, processor clusters 14 may include respective pluralities of processors (P) 30. Processors 30 may form the central processing units (CPU(s)) of SoC 10. In an embodiment, one or more processor clusters 14 may not be used as CPUs.

As mentioned above, processor clusters 14 may include one or more processors 30 that may serve as the CPU of the SoC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture (ISA) implemented by the processor. Processors may encompass processor cores implemented on an integrated circuit with other components as a system on a chip (SoC 10) or other levels of integration. Processors may further encompass discrete microprocessors, processor cores and/or microprocessors integrated into multichip module implementations, processors implemented as multiple integrated circuits, etc.

Memory controller 22 may generally include the circuitry for receiving memory operations from the other components of SoC 10 and for accessing memory 12 to complete the memory operations. Memory controller 22 may be configured to access any type of memory 12. For example, memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). Memory controller 22 may include queues for memory operations, for ordering (and potentially reordering) the operations and presenting the operations to memory 12. Memory controller 22 may further include data buffers to store write data awaiting write to memory and read data awaiting return to the source of the memory operation. In some embodiments, memory controller 22 may include a memory cache to store recently accessed memory data. In SoC implementations, for example, the memory cache may reduce power consumption in the SoC by avoiding re-access of data from memory 12 if the data is expected to be accessed again soon. In some cases, the memory cache may also be referred to as a system cache, as opposed to private caches such as an L2 cache or caches in the processors, which serve only certain components. Additionally, in some embodiments, a system cache need not be located within memory controller 22.

Peripherals in SoC 10 may be any set of additional hardware functionality included in the SoC. For example, the peripherals may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to SoC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

Communication fabric 27 may be any communication interconnect and protocol for communicating among the components of SoC 10. Communication fabric 27 may be bus-based, including shared bus configurations, cross bar configurations, and hierarchical buses with bridges. Communication fabric 27 may also be packet-based, and may be hierarchical with bridges, cross bar, point-to-point, or other interconnects.

It is noted that the number of components of SoC 10 (and the number of subcomponents for those shown in FIG. 1), such as processors 30 in each processor cluster 14, may vary from embodiment to embodiment. Additionally, the number of processors 30 in one processor cluster 14 may differ from the number of processors 30 in another processor cluster 14. There may be more or fewer of each component/subcomponent than the number shown in FIG. 1.

Hardware-Implemented DVFM Protection

Figure 2:
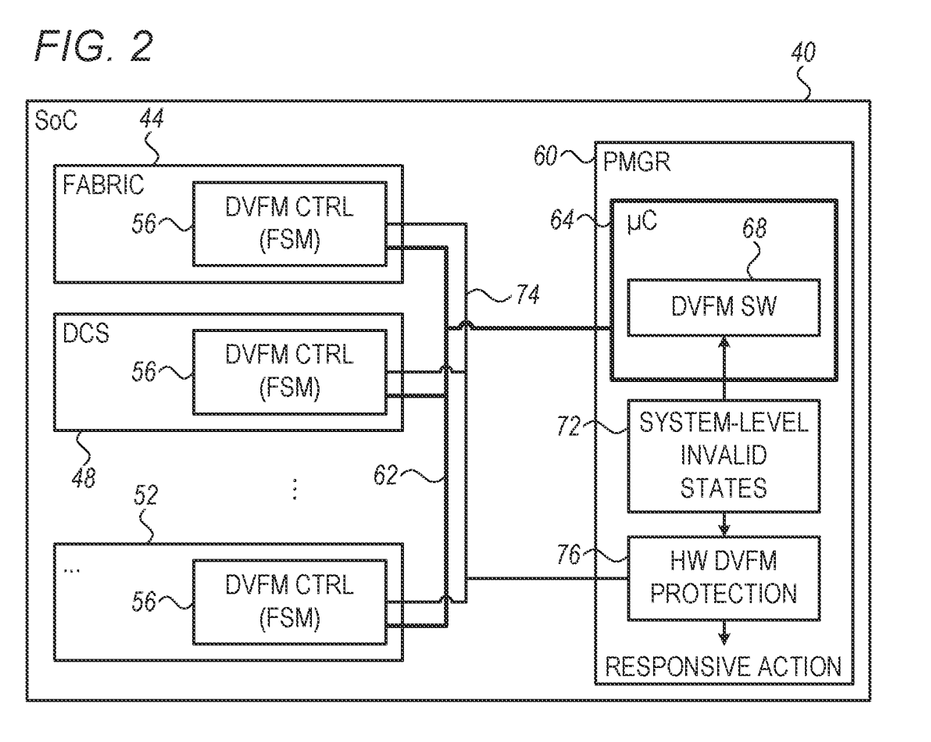
FIG. 2 is a block diagram that schematically illustrates a SoC that employs hardware-implemented DVFM protection, in accordance with an embodiment that is described herein.

FIG. 2 is a block diagram that schematically illustrates a SoC 40 that employs hardware-implemented DVFM protection, in accordance with an embodiment that is described herein. SoC 40 may be, for example, an example implementation of SoC 10 of FIG. 1 above. SoC 40 may be used in any suitable host system or device, such as, for example, a personal computer, a tablet or a smartphone.

SoC 40 includes a plurality of hardware circuits, in the present example a fabric 44, a DRAM Control Subsystem (DCS) 48 and one or more additional hardware circuits 52. Fabric 44 is configured to interconnect various memory-related components of SoC 40, such as internal memory and cache elements. DCS 48 is configured to interface with one or more DRAM devices external to SoC 40. Each hardware circuit, including fabric 44 and DCS 48, is coupled to a respective power domain and includes a respective DVFM controller 56. In a given domain, DVFM controller 56 runs a FSM that chooses the appropriate DVFM setting (DVFM state) for the domain from a predefined group of DVFM settings. The FSM may transition from one DVFM state to another based on any suitable criterion. A given DVFM setting typically specifies an operation voltage and a clock rate for the domain.

SoC 40 further includes a PMGR 60 that manages the various energy consumption aspects of the SoC, including DVFM aspects. PMGR 60 stores a list 72 of invalid system-level combinations of DVFM settings (also referred to as "invalid system-level states"). List 72 is typically predefined and locked upon bootstrapping of SoC 40.

PMGR 60 includes a microcontroller (μC) 64, which runs DVFM software 68. DVFM software 68 communicates with the various DVFM controllers 56 over an interface 62. When a given DVFM controller 56 decides to transition to a different DVFM state, it sends a transition request to DVFM software 68 over interface 62. The DVFM controllers typically issue transition requests independently of one another. DVFM software 68 may grant or deny a given transition request, depending on whether the request (possibly in combination with other ongoing or co-pending requests from one or more other domains) may cause an invalid system-level state.

SoC 40 further includes a hardware-implemented DVFM protection circuit 76, which is configured to monitor the DVFM-related operation of SoC 40 and avoid scenarios in which software 68 permits invalid system-level combinations of DVFM settings. Protection circuit 76 is aware of the same list 72 of invalid system-level states that is provided to software 68.

In some embodiments, protection circuit 76 is connected to DVFM controllers 56 of the various DVFM domains using a hardware interface 74. For a given DVFM controller in a given domain, hardware interface 74 is used for communicating the following information:

An identity of the domain, e.g., using four bits thus supporting up to sixteen domains.

A "requested-state index" indicative of the requested DVFM state (DVFM setting), e.g., using four bits thus supporting up to sixteen DVFM settings. The requested-state indices are ordered, such that a larger index corresponds to a state having a higher clock rate and/or higher voltage.

A four-phase handshake process for requesting a DVFM state transition (described below).

In an example embodiment, hardware interface 74 between protection circuit 76 and a given DVFM controller supports a four-phase handshake process that includes the following phases:

Request: The DVFM controller requests transitioning to a new DVFM state.

ACK: If the requested state transition does not cause any invalid system-level state, the protection circuit issues an acknowledgement ("ACK") to the requesting DVFM controller. Upon receiving the ACK, the DVFM controller proceeds to perform the requested transition. (If the requested DVFM state causes an invalid system-level state, the protection circuit initiates a responsive action, typically halting the system.)

Complete: The DVFM controller notifies the protection circuit that the requested transition is completed.

ACK: The DVFM controller acknowledges receipt of the "Complete" notification.

The four-phase handshake process can be carried out using two wires per domain: One wire is used for the "Request" and corresponding "ACK" (signal asserted by the DVFM controller to indicate "Request", and then de-asserted by the protection circuit to indicate "ACK"). The second wire is used in a similar manner for the "Complete" and corresponding "ACK" (signal asserted by the DVFM controller to indicate "Complete", and then de-asserted by the protection circuit to indicate "ACK").

The interface described above is chosen purely by way of example. Alternatively, any other suitable interface can be used to communicate between protection circuit 76 and DVFM controllers 56.

Detection of Invalid System-Level States

As noted above, a given invalid system-level state typically pertains to two domains that communicate with one another, one domain being in a low-clock-rate DVFM state, and the other domain being in a high-clock-rate DVFM state. The description that follows refers mainly to system-level states involving fabric 44 and DCS 48, by way of example. The disclosed techniques, however, can be used to detect invalid system-level states pertaining to any other pair of DVFM domains.

Figure 3:
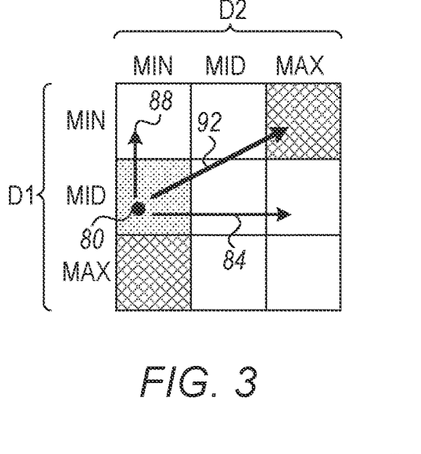
FIGS. 3 and 4 are diagrams that schematically illustrate example state transitions in a two-dimensional (2D) space of system-level DVFM states, in accordance with an embodiment that is described herein.

FIG. 3 is a diagram that schematically illustrates example state transitions in a two-dimensional (2D) space of system-level DVFM states of SoC 40, in accordance with an embodiment that is described herein. The present example relates to two DVFM domains denoted D1 and D2 (which may be, for example, fabric 44 and DCS 48). Each domain in this example has three possible DVFM settings, denoted MIN, MID and MAX.

In each domain, the MIN setting corresponds to the lowest clock rate, the MID setting corresponds to an intermediate clock rate, and the MAX setting corresponds to the highest clock rate. The voltage level in each domain typically also increases monotonically (or at least does not decrease) when progressing from MID to MID to MAX. Jointly, the two domains can be in any one of nine system-level states (system-level combinations of DVFM settings). Each system-level state is represented by a respective square in the diagram.

In the present example, the top-right state and the bottom-left state (marked with a hashing pattern in the figure) are defined as invalid system-level states. The top-right state corresponds to the case in which domain D1 is set to the lowest clock rate (MIN) and domain D2 is set to the highest clock rate (MAX). The bottom-left state corresponds to the case in which domain D1 is set to the highest clock rate (MAX) and domain D2 is set to the lowest clock rate (MIN). Both these system-level states are to be avoided, and are therefore listed in list 72 (FIG. 2) as invalid.

At a certain point in time, SoC 40 is in a system-level state 80 (in which D1=MID, D2=MIN). From state 80, three possible transitions 84, 88 and 92 are shown. Transition 84 (a request by domain D2 to transition to DVFM setting MAX) transitions to a system-level state in which D1=MID, D2=MAX). Transition 88 (a request by domain D1 to decrease its DVFM setting to MIN) transitions to a system-level state in which D1=MIN, D2=MIN). Transitions 84 and 88 are both permissible, since they both end at a valid system-level state and do not pass through any invalid system-level state during the transition. If, however, DVFM controllers 56 of both domains (D1 and D2) issue their requests in the same clock cycle, the joint outcome is transition 92, which ends at an invalid system-level state (D1=MIN, D2=MAX).

The example of FIG. 3 demonstrates that requested transitions may be permissible when performed individually, but forbidden when performed together in the same clock cycle.

Figure 4:
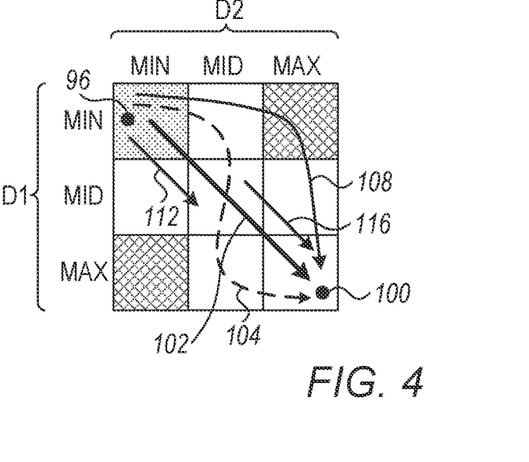

FIG. 4 is a diagram that schematically illustrates example state transitions in a 2D space of system-level DVFM states, in accordance with an embodiment that is described herein. In this example, both domains D1 and D2 need to increase their DVFM setting from MIN to MAX. At the system level, the joint transition is from an initial system-level state 96 (D1=MIN, D2=MIN) to a target system-level state 100 (D1=MAX, D2=MAX).

If both domains were to perform their respective transitions in the same clock cycle, there is some probability that the system-level state will be invalid temporarily. For example, if for some reason domain D2 performs the transition more quickly than domain D1 (all within the same clock cycle), then the transition would follow a path 108. This path traverses the invalid top-right state (D1=MIN, D2=MAX) temporarily. If, on the other hand, both domains perform their respective transitions at approximately the same speed, the transition would follow a path 102. The latter path does not pass through any invalid system-level state. Still, since there is no guarantee as to the exact path that the transition would follow, performing both transitions in the same clock cycle is not permitted.

The figure shows two possible ways of guaranteeing that the requested transition does not pass through any invalid system-level state. Both possibilities involves spreading the transition over more than one clock cycle.

One possibility is to break the transition into two cycles. In the first clock cycle, both domains transition from MIN to MID. This transition follows a path 112. In the second clock cycle, both domains transition from MID to MAX. This transition follows a path 116. As seen, both paths 112 and 116 are guaranteed not to traverse any of the invalid system-level states.

Another possibility is to break the transition into three clock cycles (following a path 104). In the first clock cycle, D2 transitions from MIN to MID. In the second clock cycle, D1 transitions from MIN to MAX. In the third clock cycle, D2 transitions from MID to MAX. In this case, too, the transition is guaranteed not to pass through any invalid system-level state.

In some embodiments, by examining the 2D space of system-level states, protection circuit 76 is able to decide whether the (one or more) transitions requested in a given clock cycle may result in traversing an invalid system-level state. This technique is demonstrated by FIGS. 5A and 5B below.

Figure 5A:
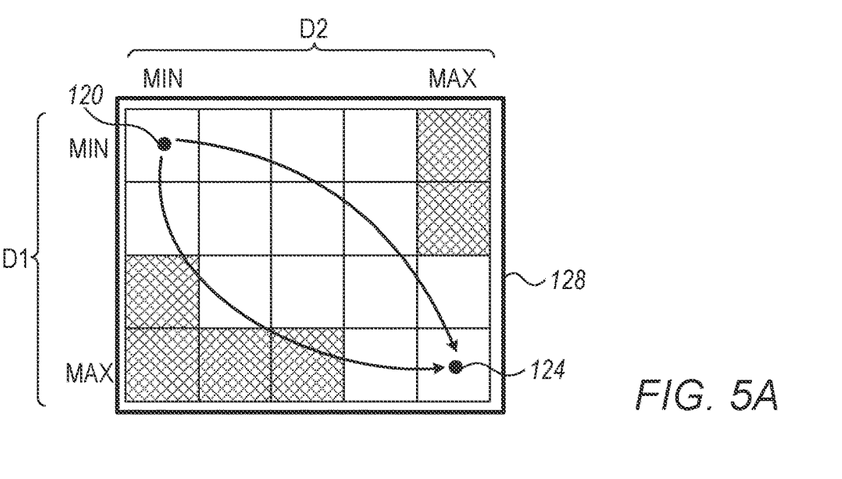
FIGS. 5A and 5B are diagrams that schematically illustrate, respectively, forbidden and permitted transitions in a 2D space of system-level DVFM states, in accordance with an embodiment that is described herein.
Figure 5B:
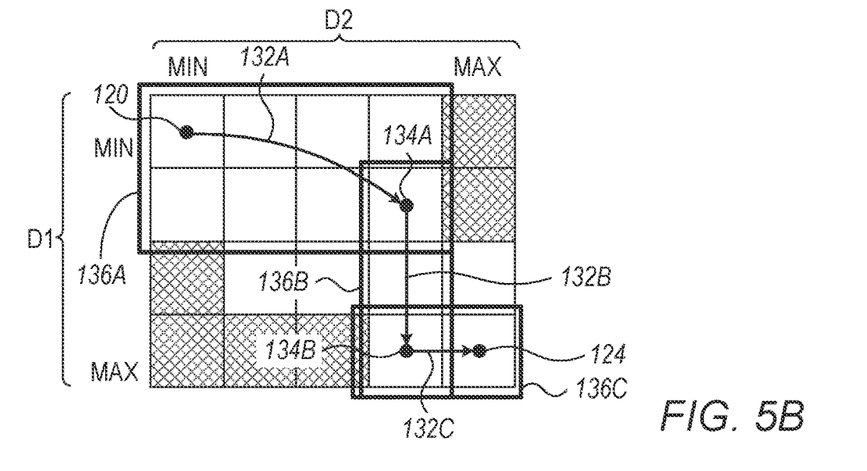

FIGS. 5A and 5B are diagrams that schematically illustrate, respectively, forbidden and permitted transitions in a 2D space of system-level DVFM states, in accordance with an embodiment that is described herein. Both figures pertain to the same scenario:

D1 has four DVFM settings and D2 has five DVFM settings.

From among the twenty system-level states, six states are predefined as invalid. These states are drawn with a hashed pattern at the top-right and bottom-left of the diagram.

Both domains D1 and D2 need to increase their DVFM setting from MIN to MAX. The initial and target system-level states are marked 120 and 124, respectively.

FIG. 5A shows an illegitimate way of performing the requested transitions, wherein both domains perform the entire transition from MIN to MAX in the same clock cycle. The figure shows two of the many possible paths that this transition may follow in the 2D space of system-level states. Since some of the possible paths traverse invalid system-level states, this possibility (both domains performing the entire transition from MIN to MAX in the same clock cycle) is not to be permitted.

In some embodiments, protection circuit 76 detects that the requested transitions run the risk of traversing an invalid system-level state by (i) identifying the subset of system-level states that are potentially traversed in performing the requested transitions, and (ii) identifying whether any of the system-level states in the subset is invalid. The "subset of system-level states that are potentially traversed in performing the requested transitions" is also referred to herein as an "uncertainty window". In FIG. 5A, the uncertainty window is marked by a frame 128, which in the present example encompasses all system-level states. As seen, uncertainty window 128 contains invalid system-level states.

Under normal conditions, software 68 is assumed to be aware of which combinations of transitions are valid and which are invalid, and not to allow invalid transitions. Therefore, if protection circuit 76 were to detect requests from both D1 and D2 to transition from MIN to MAX in the same clock cycle, the protection circuit would initiate a responsive action, e.g., halt the system or at least part thereof.

FIG. 5B shows a legitimate way of performing the requested transitions of D1 and D2, wherein the transitions are spread over three clock cycles:

In the first clock cycle, D1 increases its DVFM setting by one, and D2 increases its DVFM setting by three. In one example the transition in this clock cycle follows a path 132A. The transition ends at a system-level state 134A. For this clock cycle, protection circuit 76 calculates an uncertainty window (the subset of system-level states that are potentially traversed in performing the transitions) that is marked with a frame 136A. As seen, uncertainty window 136A does not contain any invalid system-level states.

In the second clock cycle, D1 increases its DVFM setting by two, and D2 does not modify its DVFM setting. In one example the transition in this clock cycle follows a path 132B. The transition ends at a system-level state 134B. For this clock cycle, protection circuit 76 calculates an uncertainty window 136B. This uncertainty window, too, does not contain any invalid system-level states.

In the third clock cycle, D1 does not modify its DVFM setting, and D2 increases its DVFM setting by one. In one example the transition in this clock cycle follows a path 132C. The transition ends at system-level state 124. For this clock cycle, protection circuit 76 calculates an uncertainty window 136C. Uncertainty window 136C does not contain any invalid system-level states, as well.

In summary, by examining uncertainty windows in the 2D space of system-level states, protection circuit 76 is able to detect whether requested transitions in a given clock cycle are legitimate, or whether they potentially pass through an invalid system-level state. In the former case, the protection circuit allows the transitions to proceed. In the latter case, the protection circuit initiates a responsive action, e.g., halts SoC 40.

The examples of FIGS. 3, 4, 5A and 5B above refer to two DVFM domains, by way of example. More generally, protection circuit 76 may protect a larger number of domains. In such cases, protection circuit 76 typically carries out the above-described technique for various pairs of domains. In some embodiments, the protection circuit repeats the disclosed technique for every pair of domains. In other embodiments, the protection circuit repeats the disclosed technique only for domains that communicate with one another.

In some embodiments, the list of invalid system-level states (list 72 in FIG. 2) is specified as a list of conditions of the form:

INVALID if (A_state ≤ cutoff_A) AND (B_state ≥ cutoff_B)

wherein A_state and B_state denote the DVFM settings in the two domains being evaluated, and cutoff_A and cutoff_B denote respective thresholds.

In other words, for first and second power domains among the multiple power domains of SoC 40, protection circuit 76 may detect that a given system-level combination of domain-specific power settings is valid, by detecting that (i) a first index, of a domain-specific power setting requested for the first power domain, is lower than a first predefined threshold, and (ii) a second index, of a domain-specific power setting requested for the second power domain, is higher than a second predefined threshold. This format enables definition of various corner regions, such as the top-right and bottom-left regions of invalid states seen in FIGS. 3, 4, 5A and 5B.

In the embodiments described above, any invalid system-level state is specified as a combination of DVFM settings of two DVFM domains (typically domains that communicate with one another). In alternative embodiments, an invalid system-level state may be defined as a combination of DVFM settings of more than two domains. Protection circuit 76, and the disclosed techniques in general, can be adapted in a straightforward manner to handle such multi-domain system-level states. In such embodiments, the space of system-level states has more than two dimensions, and is a generalization of the 2D spaces shown in FIGS. 3, 4, 5A and 5B.

In some embodiments, a given DVFM controller 56 uses one set of indices for enumerating the DVFM settings internally, and a different set of indices for indicating requested transitions to protection circuit 76. The latter indices may be, for example, four-bit indices. In this manner, protection circuit 76 may operate using a generic space of indices, without having to be aware of the internal DVFM state enumeration in DVFM controllers 56.

Figure 6:
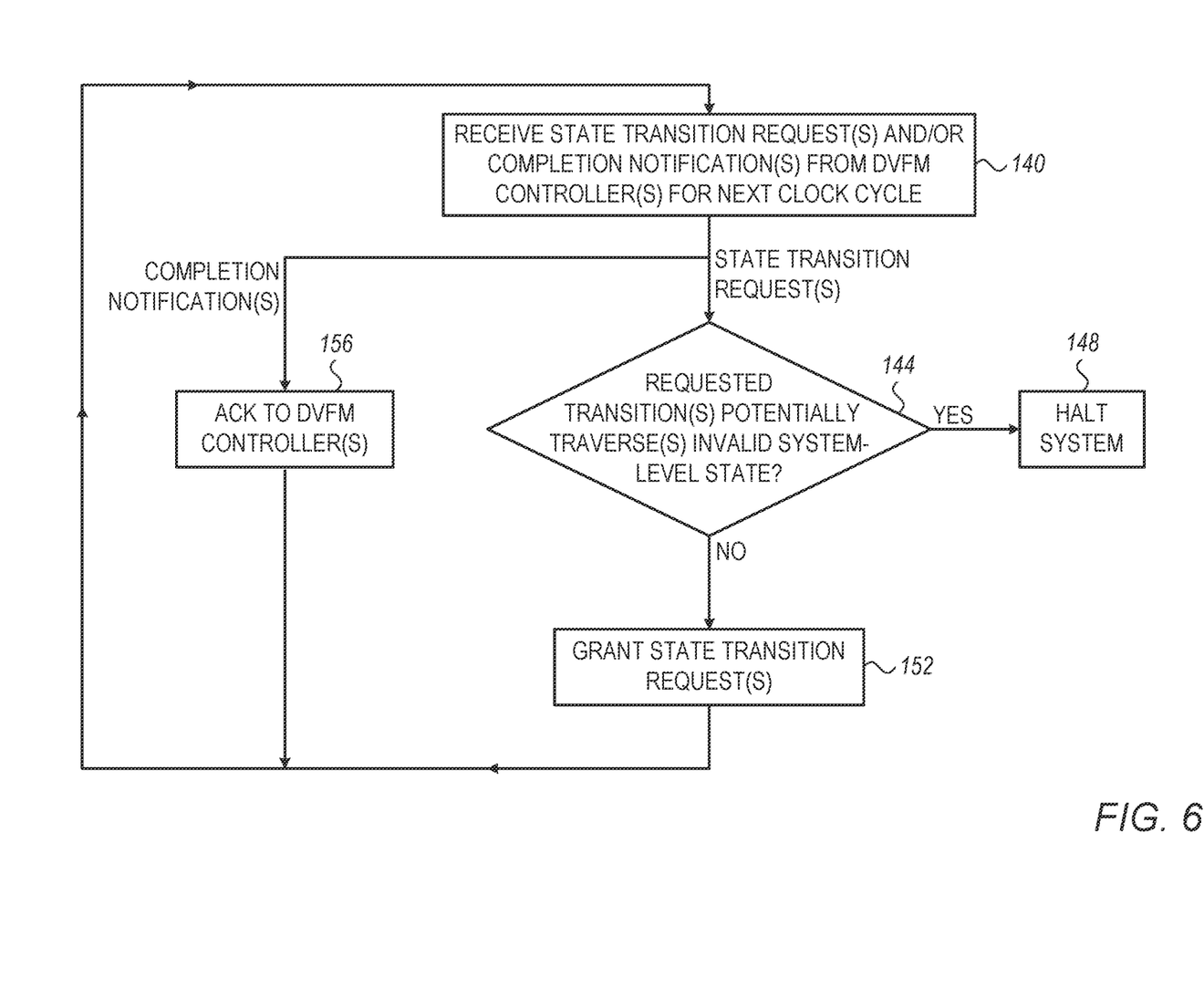
FIG. 6 is a flow chart that schematically illustrates a method for protection against invalid system-level DVFM states, in accordance with an embodiment that is described herein.

FIG. 6 is a flow chart that schematically illustrates a method for protection against invalid system-level DVFM states, in accordance with an embodiment that is described herein. The method begins at a message reception stage 140, at which protection circuit 76 receives one or more state transition requests and/or one or more completion notifications, from DVFM controllers 56, for the next clock cycle. Each state-transition request is received from a certain DVFM controller 56, requesting to transition to a new DVFM setting. Each completion notification is received from a certain DVFM controller 56, notifying that a previously-granted state transition was completed.

At a checking stage 144, protection circuit 76 checks whether the requested transition or transitions for the next clock cycle potentially traverse an invalid system-level state. As explained above, checking stage 144 is typically implemented by protection circuit 76 defining an uncertainty window for the clock cycle in question, and checking whether the uncertainty window contains any invalid system-level states.

If the transition(s) requested for the next clock cycle potentially traverse(s) an invalid system-level state, protection circuit 76 halts at least part of SoC 40, at a responsive action stage 148. If not, the protection circuit allows the requested transition(s) to proceed, at a granting stage 152.

At a completion acknowledgement stage 156, protection circuit 76 sends an acknowledgement to each DVFM controller 56 that sent a completion notification. The method then loops back to stage 140 for evaluating the requested transition(s) and completion(s) for the next clock cycle.

Although the embodiments described herein mainly address mitigation of invalid system-level states, the methods and systems described herein can also be used in other applications, such as in mitigating forbidden state transitions within a given DVFM domain.

Consider, for example, a scenario in which a certain DVFM domain has five DVFM settings denoted F1, F2, F3, F4 and F5. Assume also that all transitions within the subset {F1, F2, F3} are allowed, all transitions within the subset {F3, F4, F5} are allowed, but any transition between the two subsets must be performed via F3. By specifying the condition INVALID if (A_state ≤ cutoff_A) AND (B_state ≥ cutoff_B)

with both A and B standing for the same domain, protection circuit 76 can also be used for preventing forbidden state transitions within that domain.

Figure 7:
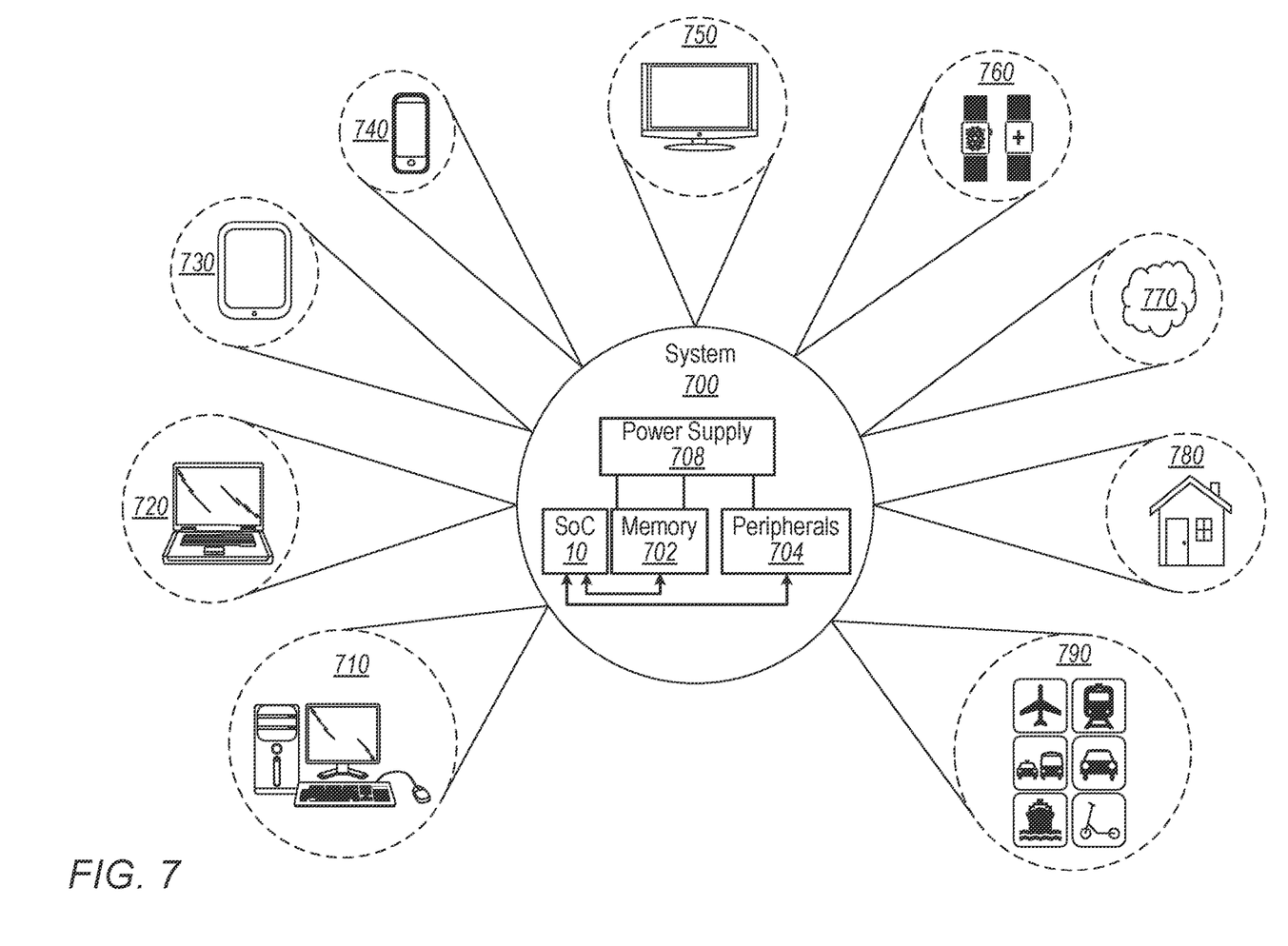
FIG. 7 is a block diagram that schematically illustrates a system, in accordance with an embodiment that is described herein.

FIG. 7 is a block diagram that schematically illustrates a system 700, in accordance with an embodiment that is described herein. In the illustrated embodiment, the system 700 includes at least one instance of a system on a chip (SoC) 10 coupled to one or more peripherals 704 and an external memory 702. A power supply (PMU) 708 is provided which supplies the supply voltages to the SoC 10 as well as one or more supply voltages to the memory 702 and/or the peripherals 154. In some embodiments, more than one instance of the SoC 10 (e.g., the SoCs 10A-10q) may be included (and more than one memory 702 may be included as well).

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SoC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Figure 8:
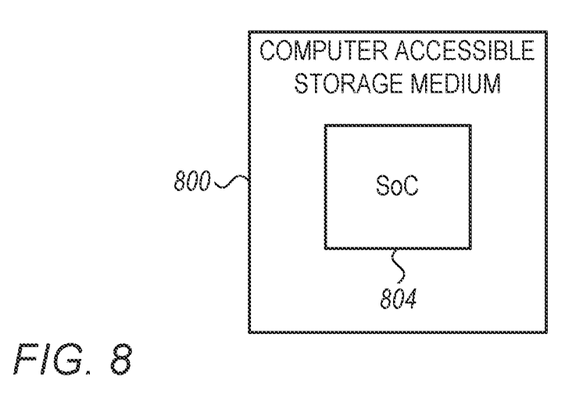
FIG. 8 is a block diagram that schematically illustrates a computer-readable storage medium, in accordance with an embodiment that is described herein.

FIG. 8 is a block diagram that schematically illustrates a computer-readable storage medium 800, in accordance with an embodiment that is described herein. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM)), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 8 may store a database 804 representative of the SoC 10. Generally, the database 804 may be a database which can be read by a program and used, directly or indirectly, to fabricate the hardware including the SoC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates which also represent the functionality of the hardware including the SoC 10. The netlist may then be placed and routed to produce a data set describing geometric shapes to be applied to masks. The masks may then be used in various semiconductor fabrication steps to produce a semiconductor circuit or circuits corresponding to the SoC 10. Alternatively, the database 804 on the computer accessible storage medium 800 may be the netlist (with or without the synthesis library) or the data set, as desired.

While the computer accessible storage medium 800 stores a representation of the SoC 10, other embodiments may carry a representation of any portion of the SoC 10, as desired, including any subset of the components shown in FIG. 1 or 2, for example. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]-is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
multiple hardware circuits, which are coupled to respective power domains having respective sets of domain-specific power settings; and
protection circuitry, configured to:
monitor requests in which one or more of the hardware circuits request transitions between the domain-specific power settings;
determine, from among multiple system-level combinations of the domain-specific power settings, a subset of system-level combinations that could potentially be traversed in performing the requested transitions; and
grant the requested transitions in response to verifying that all the system-level combinations in the subset are specified as valid.

2. The system according to claim 1, wherein a given domain-specific power setting comprises multiple control parameters.

3. The system according to claim 2, wherein the multiple control parameters comprise at least a voltage and a clock rate for the respective power domain.

4. The system according to claim 1, wherein the protection circuitry is further configured to halt at least part of the system in response to verifying that at least one of the system-level combinations in the subset is specified as invalid.

5. The system according to claim 1, wherein, in the requests, the hardware circuits are configured to specify requested domain-specific power settings using indices having a defined order.

6. The system according to claim 5, wherein, for first and second power domains among the power domains, the protection circuitry is configured to detect that a given system-level combination of domain-specific power settings is valid, by detecting that:
a first index, of a domain-specific power setting requested for the first power domain, is lower than a first predefined threshold; and
a second index, of a domain-specific power setting requested for the second power domain, is higher than a second predefined threshold.

7. The system according to claim 1, wherein the protection circuitry is configured to:
while a first transition is in progress in a first power domain, receive a second request for a second transition in a second power domain; and
upon detecting that the second transition potentially causes an invalid system-level combination, defer the second request and re-evaluate the second request only after the first transition is completed.

8. A method, comprising:
operating multiple hardware circuits, which are coupled to respective power domains having respective sets of domain-specific power settings;
monitoring requests in which one or more of the hardware circuits request transitions between the domain-specific power settings;
determining, from among multiple system-level combinations of the domain-specific power settings, a subset of system-level combinations that could potentially be traversed in performing the requested transitions; and
granting the requested transitions in response to verifying that all the system-level combinations in the subset are specified as valid.

9. The method according to claim 8, wherein a given domain-specific power setting comprises multiple control parameters.

10. The method according to claim 9, wherein the multiple control parameters comprise at least a voltage and a clock rate for the respective power domain.

11. The method according to claim 8, wherein the requests specify requested domain-specific power settings using indices having a defined order.

12. The method according to claim 11, wherein, for first and second power domains among the power domains, detecting that a given system-level combination of domain-specific power settings is valid comprises detecting that:
a first index, of a domain-specific power setting requested for the first power domain, is lower than a first predefined threshold; and
a second index, of a domain-specific power setting requested for the second power domain, is higher than a second predefined threshold.

13. The method according to claim 8, further comprising:
while a first transition is in progress in a first power domain, receiving a second request for a second transition in a second power domain; and
upon detecting that the second transition potentially causes an invalid system-level combination, deferring the second request and re-evaluate the second request only after the first transition is completed.

14. A System-on-Chip (SoC), comprising:
multiple hardware circuits, which are coupled to respective power domains having respective sets of domain-specific power settings; and
protection circuitry, configured to:
monitor requests in which one or more of the hardware circuits request transitions between the domain-specific power settings;
determine, from among multiple system-level combinations of the domain-specific power settings, a subset of system-level combinations that could potentially be traversed in performing the requested transitions; and
grant the requested transitions in response to verifying that all the system-level combinations in the subset are specified as valid.

15. The SoC according to claim 14, wherein the hardware circuits comprise at least a memory controller, one or more processors and a communication fabric.

16. The SoC according to claim 14, further comprising a controller configured to run Dynamic Voltage and Frequency Management (DVFM) software that receives the requests from the one or more of the hardware circuits, and performs or denies the requests.

17. The SoC according to claim 16, wherein the protection circuitry is configured to operate in parallel to the DVFM software, and to deny at least one request that is not denied by the DVFM software.

18. The SoC according to claim 16, wherein the protection circuitry is further configured to halt at least part of the SoC in response to detecting a request that (i) causes traversal of an invalid system-level combination, but (ii) is not denied by the DVFM software.

* * * * *

UNITED STATES PATENT AND TRADEMARK OFFICE
CERTIFICATE OF CORRECTION

| | | |
|---|---|---|
| PATENT NO. | : 12,228,989 B2 | Page 1 of 1 |
| APPLICATION NO. | : 18/522324 | |
| DATED | : February 18, 2025 | |
| INVENTOR(S) | : Doron Rajwan, Ami Schwartzman and Lior Zimet | |

It is certified that error appears in the above-identified patent and that said Letters Patent is hereby corrected as shown below:

On the Title Page

Item (73) Assignee, Please change "Apple Inc" to --Apple Inc.--.

Signed and Sealed this
Twenty-second Day of July, 2025

Coke Morgan Stewart
*Acting Director of the United States Patent and Trademark Office*